(12) United States Patent
Dunn et al.

(10) Patent No.: US 7,486,676 B1
(45) Date of Patent: Feb. 3, 2009

(54) ARRANGEMENT FOR ROUTING A RECEIVED SS7 SIGNALING MESSAGE BASED ON PACKET CLASSIFICATION

(75) Inventors: Randal L. Dunn, Cary, NC (US); Paul A. Schmidt, Cary, NC (US); Uwe Sellentin, Apex, NC (US); Wayne N. Taylor, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 1478 days.

(21) Appl. No.: 10/022,443

(22) Filed: Dec. 20, 2001

(51) Int. Cl.
*H04L 12/26* (2006.01)
(52) U.S. Cl. ..................................... 370/392
(58) Field of Classification Search ................ 370/389, 370/392, 410, 395.31, 426
See application file for complete search history.

(56) References Cited

U.S. PATENT DOCUMENTS

| | | | |
|---|---|---|---|
| 5,912,628 A * | 6/1999 | Jeong ........................ 340/2.4 |
| 6,662,017 B2 | 12/2003 | McCann et al. | |
| 6,876,632 B1 * | 4/2005 | Takeda ........................ 370/259 |
| 6,940,866 B1 * | 9/2005 | Miller et al. ................. 370/426 |
| 7,035,239 B2 | 4/2006 | McCann et al. | |
| 2001/0008532 A1 * | 7/2001 | Lee ............................ 370/467 |
| 2002/0186702 A1 * | 12/2002 | Ramos et al. ............... 370/410 |
| 2003/0016684 A1 * | 1/2003 | Prasad et al. ................ 370/410 |
| 2004/0081206 A1 * | 4/2004 | Allison et al. ............... 370/522 |
| 2004/0137904 A1 * | 7/2004 | Gradischnig ................. 455/446 |
| 2006/0078008 A1 * | 4/2006 | Bordonaro et al. .......... 370/522 |

* cited by examiner

*Primary Examiner*—Aung S Moe
*Assistant Examiner*—Feben Haile
(74) *Attorney, Agent, or Firm*—Leon R. Turkevich

(57) ABSTRACT

A signaling network node is configured for identifying a received signaling message as corresponding to one of a plurality of prescribed message classes, based on prescribed message class selection criteria. The signaling network node determines an outbound linkset for the received signaling message based on selected message parameters, for example destination point code, input linkset, service indicator values, etc., where the outbound linkset typically includes at least two links. The signaling network node selects one of the at least two links based on the identified message class.

39 Claims, 4 Drawing Sheets

ARRANGEMENT FOR ROUTING A RECEIVED SS7 SIGNALING MESSAGE BASED ON PACKET CLASSIFICATION

BACKGROUND OF THE INVENTION

1. Field of the Invention

The present invention relates to routing a received Signaling System 7 (SS7) message in a Common Channel Interoffice Signaling (CCIS) network of a out-of-band telecommunications system.

2. Description of the Related Art

Common Channel Interoffice Signaling (CCIS) networks provide out of band signaling for telecommunications networks such as public switched telephone networks. Most of the signaling communications for telephone networks utilize Signaling System 7 (SS7) protocol. An exemplary SS7 compliant CCIS network includes Service Switching Points (SSPs) (i.e., an SS7 capable telephony switch), Signaling Transfer Points (STPs), and data links between the STPs and SSPs and various telephone switching offices of the network.

As recognized in the art, the hardware and software operations of the SS7 protocol are divided into "layers", similar to the Open Systems Interconnect (OSI) Network Model specified by the International Standards Organization (ISO). The "lowest levels" of the SS7 protocol include the Message Transfer Part (MTP) Level 1, Level 2, and Level 3. MTP Level 1 and Level 2 are equivalent to the OSI Physical Layer and the OSI Data Link layer, respectively. MTP Level 3, equivalent to the OSI NetworkLayer, provides message routing between signaling points in the SS7 network, and reroutes traffic away from failed links and signaling points and controls traffic when congestion occurs.

SS7 messages (also referred to as signal units) are routed throughout the SS7 network based on point codes specified within the SS7 message. In particular, each node of the signaling network is assigned a prescribed point code for purposes of addressing signaling messages throughout the SS7 network. The point code includes components that represent a network hierarchy based on the protocol being deployed.

One type of signal unit, known as a Message Signal Unit (MSU), includes a routing label which allows an originating signaling point to send information to a destination signaling point across the network. The routing label includes an originating point code (OPC) specifying the originating signaling node, a destination point code (DPC) specifying the destination for the SS7 messaging packet, and a signaling link selection (SLS) field. Hence, the selection of outgoing link is based on information in the DPC and SLS.

The size of the point code may vary depending on protocol; for example, each North American point code according to the American National Standards Institute (ANSI) uses 24 bits, whereas each point code specified by the International Telecommunication Union (ITU) uses 14 bits. In particular, an ANSI point code specifies a network hierarchy based on network, cluster, and member octets (e.g., 245-16-0 decimal). An octet is an 8-bit (i.e., 1-byte) value which can contain any value between zero and 255. Telcos with large networks have unique network identifiers while smaller operators are assigned a unique cluster number within networks 1 through 4 (e.g., 1-123-9). Network number 0 is not used; network number 255 is reserved for future use.

ITU-T point codes are pure binary numbers which may be stated in terms of zone, area/network, and signaling point identification numbers. For example, the point code 5557 (decimal) may be stated as 2-182-5 (binary 010 10110110 101).

The STPs are program controlled packet data switching systems. In operation, an STP will receive a packet data message from another node of the network, for example from an end office switching system. The STP analyzes the point code information in the packet and routes the packet according to a static routing table, also referred to as a translation table, stored within the STP. Any packet having a particular point code is output on a port going to the next CCIS signaling node specified by translation of that point code. Hence, the routing table stores for each (24-bit or 14-bit) point code a corresponding port address for outputting the packet to a specified linkset.

Once the STP selects the outbound linkset for the packet, the STP selects the outbound link for outputting the packet, for example using a round-robin scheme. In some cases, packets may be routed to a specific link within the linkset based on the SLS field: for example, even SLS field values may be mapped to one link of an outbound linkset, and odd SLS field values may be mapped to a second link of the outbound linkset.

The STP performs the same routing decision for received packets based on the respective point code information, regardless of packet type. Hence, the STP is unable to distinguish between different messages types, for example Integrated Services Digital Network User Part (ISDNUP) traffic, Signaling Connection Control Part (SCCP) traffic, and/or Transaction Capabilities Application Part (TCAP) traffic. Consequently, instances may arise where packets may be discarded due to congestion conditions. For example, an STP that receives a large amount of TCAP traffic destined for an outbound linkset having two links would evenly distribute the TCAP traffic across the two links; however, any additional SCCP traffic that was destined for the same outbound linkset could be discarded due to congestion encountered on the links on the outbound linkset.

Hence, there is a concern that a signaling node (e.g., a mobile switching center) is unable to distinguish between messages types, where high priority messages such as call setup messages may be adversely affected by less critical messages, such as Short Message Service (SMS) messages

SUMMARY OF THE INVENTION

There is a need for an arrangement that enables signaling messages to be routed by a signaling network node based on a determined message type or message class.

There also is a need for an arrangement that enables a signaling network node to provide guaranteed quality of service to network traffic based on determined message type or message class.

These and other needs are attained by the present invention, where a signaling network node is configured for identifying a received signaling message as corresponding to one of a plurality of prescribed message classes, based on prescribed message class selection criteria. The signaling network node determines an outbound linkset for the received signaling message based on selected message parameters, for example destination point code, input linkset, service indicator values, etc., where the outbound linkset typically includes at least two links. The signaling network node selects one of the at least two links based on the identified message class. Hence, individual links of a linkset can be selected based on the identified message class, enabling the signaling network node to provide quality of service based link selection for the received signaling message.

One aspect of the present invention provides a signaling network node configured for routing a received signaling message having message information. The signaling network node includes a routing table, and a processor. The routing table is configured for storing message class entries identifying respective message classes, each message class entry specifying at least one destination link identifier for a corresponding destination link assigned to the corresponding message class. The processor is configured for selecting one of the destination links based on classifying the received signaling message as assigned to the corresponding message class, based on prescribed message class selection criteria. The storage of message class entries specifying different destination links for respective message classes enables the processor to direct signaling message traffic to different destination links based on classification of the received signaling messages. Hence, signaling messages can be directed over specified signaling links, enabling enforcement of prescribed quality of service policies.

Another aspect of the present invention provides a method in a signaling network node for routing a received signaling message. The method includes storing message class entries identifying respective message classes in a routing table, each message class entry specifying at least one destination link identifier for a corresponding destination link assigned to the corresponding message class. The method also includes classifying a received signaling message as assigned to one of the message classes, based on prescribed message class selection criteria. One of the message class entries is selected based on classifying the received signaling message, and one of the destination links is selected based on the at least one destination link identifier specified in the one message class entry.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
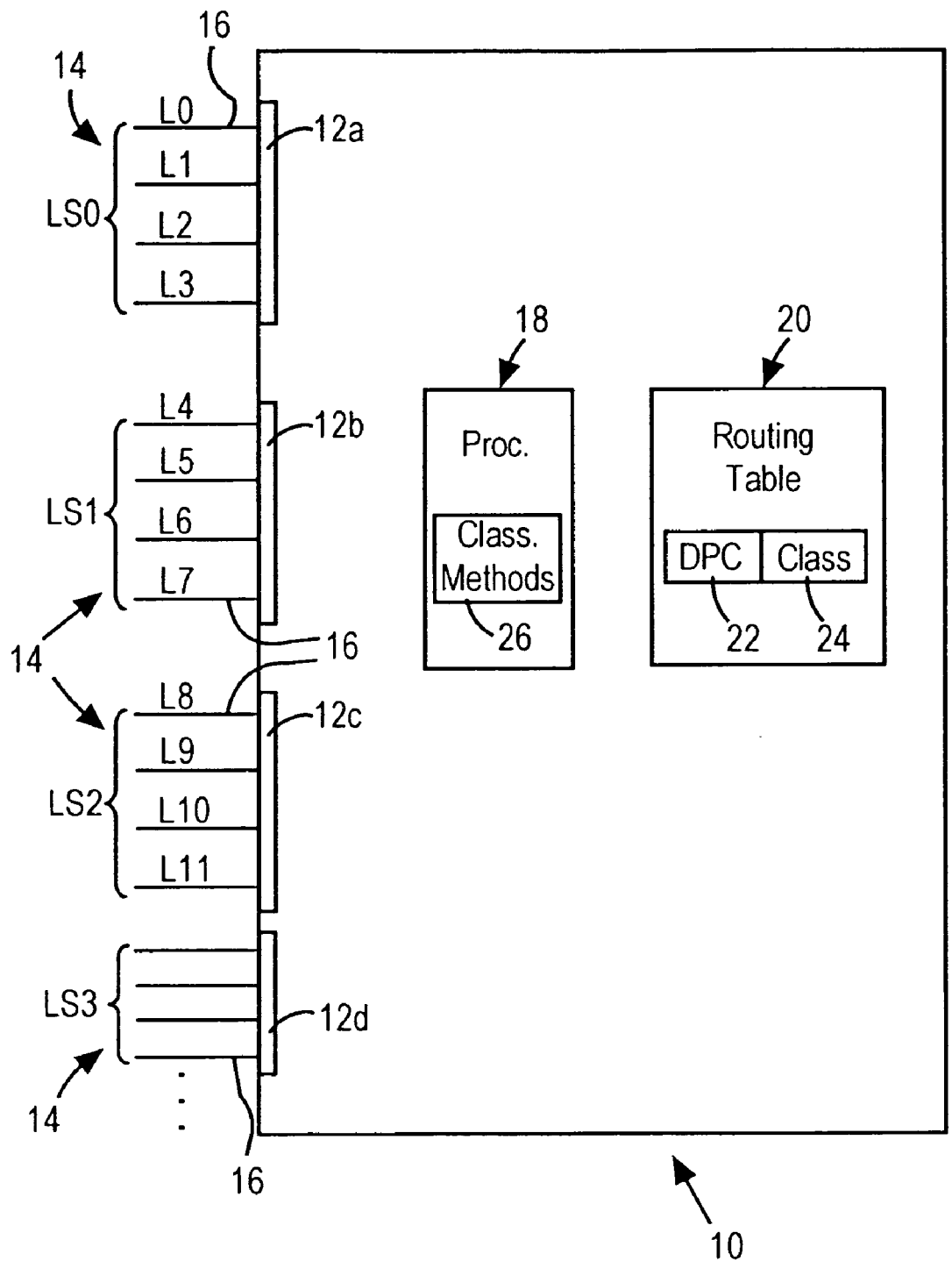
FIG. 1 is a block diagram illustrating an SS7 signaling node configured for selecting an output link based on classifying a received signaling message according to prescribed classification parameters, according to an embodiment of the present invention.

FIG. 1 is a block diagram illustrating an SS7 signaling node 10 implementing quality of service-based routing, according to an embodiment of the present invention. The SS7 signaling node 10, implemented for example as a signaling transfer point in a public switch telephone network, is configured for providing quality of service capabilities to existing PSTN based SS7 networks (i.e., frame relay based SS7 networks), as well as Internet Protocol (IP) based SS7 networks. Hence, the signaling network node 10 may be implemented as an SS7 network node that relies upon transport of Message Transfer Part (MTP) 3 messages across an IP-based network providing a guaranteed quality of service; such guaranteed quality of service can be provided in an IP based network based on setting prescribed values to type of service (TOS) fields within the IP headers. An exemplary signaling network node 10 is the conunercially available Cisco IP Transfer Point from Cisco Systems, Inc., San Jose, Calif.

Regardless of whether the signaling network node 10 is implemented in a conventional PSTN based SS7 network utilizing frame relay, or an IP based SS7 network, the disclosed signaling network node 10 is configured for providing quality of service based switching of network traffic, enabling implementation of network prioritization based on different traffic types. Hence, the signaling network node 10 can separate different traffic types, for example ISUP, and SCCP traffic, and direct the ISUP and SCCP traffic over respective assigned links or sets of links.

The signaling network node 10 includes linkset interfaces 12 configured for sending and receiving signaling messages from respective input linksets (LS) 14; for example, the linkset interfaces 12a, 12b, 12c, and 12d are configured for receiving signaling messages from the input linksets LS0, LS1, LS2 and LS3, respectively. As recognized in the art, each linkset (LS) 14 typically is connected to another corresponding signaling node within the SS7 network. Each linkset (LS) 14 has at least one assigned signaling link 16 that uniquely identifies that link (e.g., L0) relative to other links within the signaling network node 10. Hence, the links 16 are grouped in prescribed linksets 14 having respective linksets identifiers (e.g., LS0). As illustrated in FIG. 1, the links L0, L1, L2, and L3 are grouped and assigned to linkset LS0, the links L4, L5, L6 and L7 are assigned to linkset LS1, the links L8, L9, L0 and L11 are assigned to linkset LS2, etc.

The signaling network node 10 also includes a processor 18 configured for controlling routing of the network traffic, and a routing table 20 configured for storing routing information for the processor 18. In particular, the processor 18 is configured for selecting a destination link 16 for a received signaling message based on matching destination point code information within the receiving signaling message with a linkset entry 22 specifying a destination point code (DPC), and based on a matching message class entry 24. In particular, the processor 18 is configured for classifying the received signaling message as assigned as a member to one of a plurality of prescribed message classes. Classes can be assigned to packets using different classification methods 26 selected by the administrator. Exemplary classification methods are illustrated below with respect to FIG. 2. Based on the classification methods utilized by the processor 18, the processor retrieves the routing information from the routing table 20 based on the matching class entry 24, enabling the processor 18 to select a destination link 16 based on classifying the received signaling message as assigned to the corresponding message class.

Figure 2:
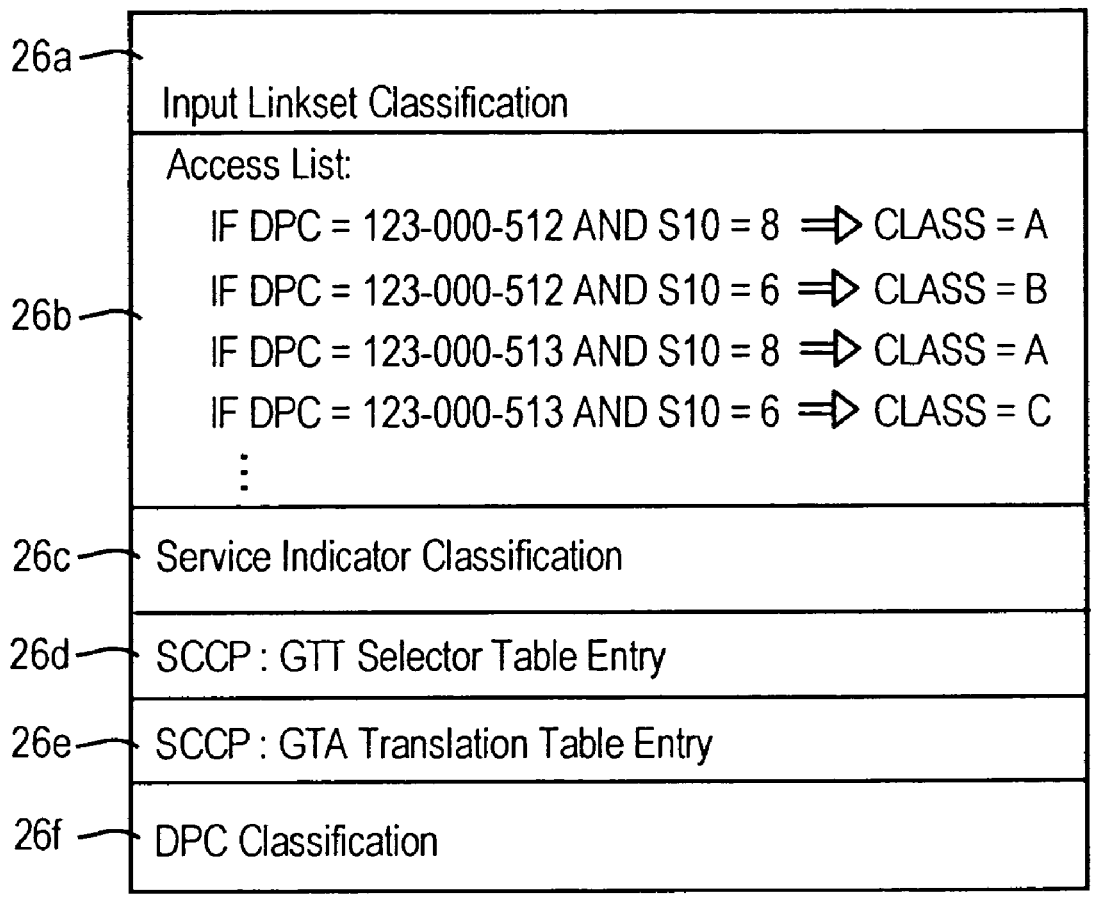
FIG. 2 is a diagram illustrating different classification methods that may be used by the processor of FIG. 1 in classifying a received signaling message, according to an embodiment of the present invention.

FIG. 2 is a diagram illustrating classification methods 26 that may be used by the processor 18 in classifying received packets. Typically any one or all of the following classification methods may be loaded into the processor 18 for execution, and selected by an administrator: input linkset classification 26a, access list classification 26b, service indicator classification 26c, SCCP classification based on a GTT selector table entry 26*d*, SCCP classification based on a GTA translation table entry 26*e*, or destination point code (DPC) classification 26*f*.

Execution of the input linkset classification method 26*a* by the processor 18 causes the received signaling messages to be classified based on identifying the input linkset 14 having received the signaling message; hence, the processor 18 classifies all messages received on a given input linkset 14 (e.g., L S2), to be classified as a member of a specific class. For example, the signaling messages received on linksets LS0, LS1, LS2 and LS3 can be classified as belonging to class 0, 1, class 2, and class 3, respectively. The input linkset classification method 26*a* may be used when a linkset 14 is known to supply traffic from a particular signaling node, for example a mobile switching center (MSC), which may have a higher priority traffic compared to traffic from another linkset receiving traffic from a short message service center (SMSC).

The access list classification method 26*b* enables the processor 18 to classify packets as a member of a class based on whether the contents of the received signaling message match prescribed user-selected selection criteria, for example a user-selected pattern. For example, the access list classification method 26*b* may specify logical parameters for matching to a prescribed quality of service class, based on any one of originating point code (OPC), destination point code (DPC) service indicator octet (SIO), etc. Hence, the access list classification method 26*b* enables a user to precisely define classification criteria using computation logic.

The service indicator classification method 26*c* enables the processor 18 to classify packets based on the service indicator (SI) field in the SS7 signaling message. In particular, all MTP-3 headers include a 4-bit service indicator (SI) value within the service information octet (SIO) that uniquely identifies that type of MTP-3 message. Hence, the service indicator field, used to describe the type of packet (e.g., Signaling Network Management Message (SNM), Maintenance Regular Message (MTN), Maintenance Special Message (MTNS), Signaling Connection Control Part (SCCP), Telephone User Part (TUP), ISDN User Part (ISUP) etc.), can be used to map the received signaling message to a corresponding class. Use of the service indicator classification method 26*c* by the processor 18 requires less processing resources than the logic based access list classification method 26*b*.

The SCCP based classification methods 26*d* and 26*e* classify packets based on global title translation (GTT) as specified by SS7. In particular, GTT provides a database of translation types, typically telephone numbers, that map to a destination point code; hence, the processor 18 may use the GTT classification method 26*d* to classify the received signaling messaging during mapping of the translation type, where the GTT database includes an extra field for the classification identifier. A similar method 26*e* may be set up for the global title address (GTA) translation, where an extra class identifier field in the GTA translation table enables the processor 18 to identify the corresponding assigned class.

The destination point code (DPC) classification 26*f* also may be used by the processor 18 to classify packets based on the destination of the packet, or a least a portion of the destination point code. Hence, packets with different destinations can be classified as members of different classes. In addition, selected portions of the point code may be used, depending on the network hierarchy used to identify a class.

The processor 18, upon having classified the received signaling message, selects one of the destination links based on classifying the received signaling message to a corresponding class. In particular, the processor 18 accesses the routing table 20 to find a matching message class entry 24 that corresponds to the identified message class for the received signaling message. The processor is then able to retrieve at least one destination link identifier from the message class entry 24 for the corresponding destination link 16 assigned to the message class for the received signaling message.

Figure 3:
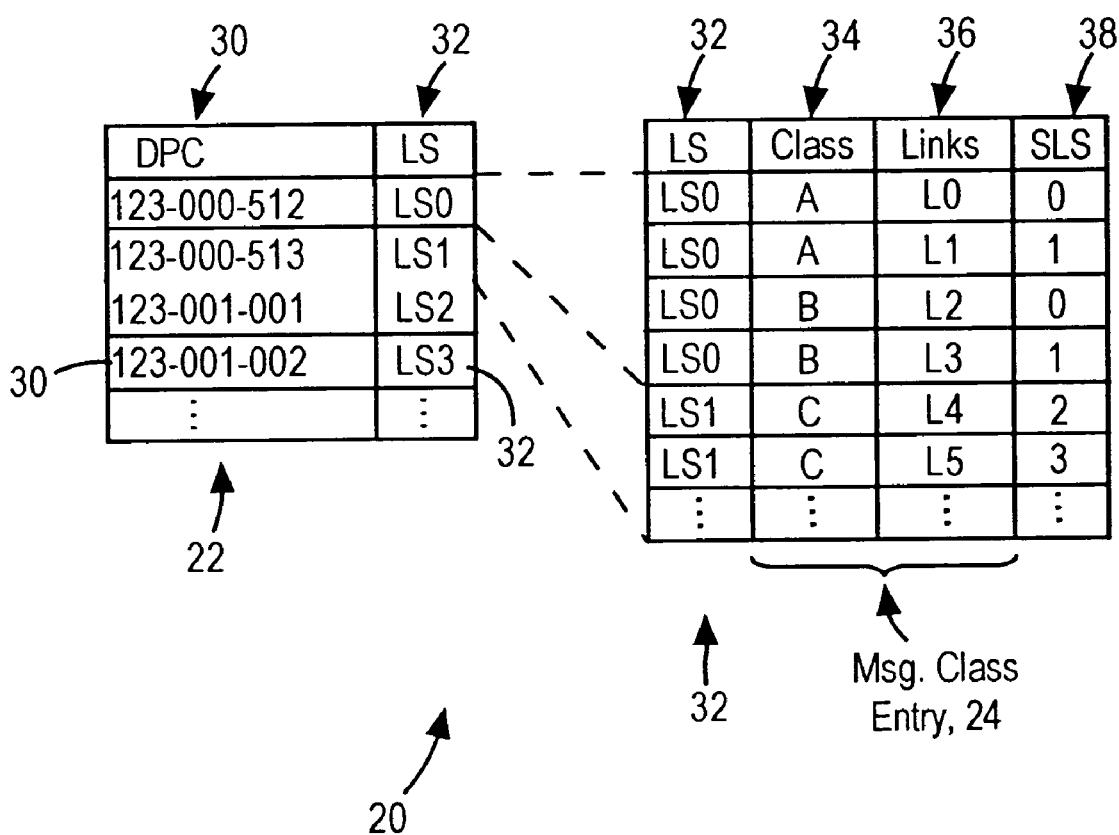
FIG. 3 is a diagram illustrating in detail the routing table of FIG. 1 having message class entries for message class-based routing, according to an embodiment of the present invention.

FIG. 3 is a diagram illustrating in further detail the routing table 20 of FIG. 1 according to an embodiment of the present invention. The routing table 20 includes linkset entries 22 and message class entries 24. For example, each linkset entry 22 includes a destination point code entry 30 and a linkset identifier 32 identifying an assigned linkset 14. Hence, in this example signaling messages are first mapped to a destination linkset 14 based on identifying the corresponding linkset 32 (e.g., LS0) for a matching destination point code 30 (e.g., 123-000-512.).

The message class entry 24 is configured for storing message class identifiers 34 and at least one destination link identifier 36 for a corresponding destination link 16 assigned to the corresponding message class. As illustrated in FIG. 3, the message class entries for class "A" include the destination link identifiers L0 and L1; hence, any received signaling message classified as class "A" to be output on the outbound linkset "LS0" can be assigned to either link L0 or L1 on the linkset interface 12*a*; if the received signaling message to be output on the outbound linkset LS0 is classified as belonging to class "B", then the received signaling message may be output on either link L2 or L3 on the linkset interface 12*a*.

Hence, individual links can be assigned a class, enabling received signaling messages to be assigned to one or more assigned links of a outbound linkset based on classifying the received signaling message, and routing the received signaling message to the corresponding groups of links within that linkset based on the assigned class. Note that one or more links may be assigned to a given class.

The routing table 20 also includes a signaling link selection (SLS) entry 38 associated with a destination link identifier, enabling the processor 18 to select an individual link 16 within a group of links assigned to a prescribed class within a linkset. Hence, the SLS field with the signaling link code (SLC) field of an MTP 3 routing label may be used in combination with the determined quality of service class field 34 to index the routing table 20. Note the SLS entry 38 may be modified according to implementation (e.g., ANSI vs. ITU-T). As apparent from the foregoing, different indexing hierarchies can be used as preferred by the administrator of the signaling network node 10.

Figure 4:
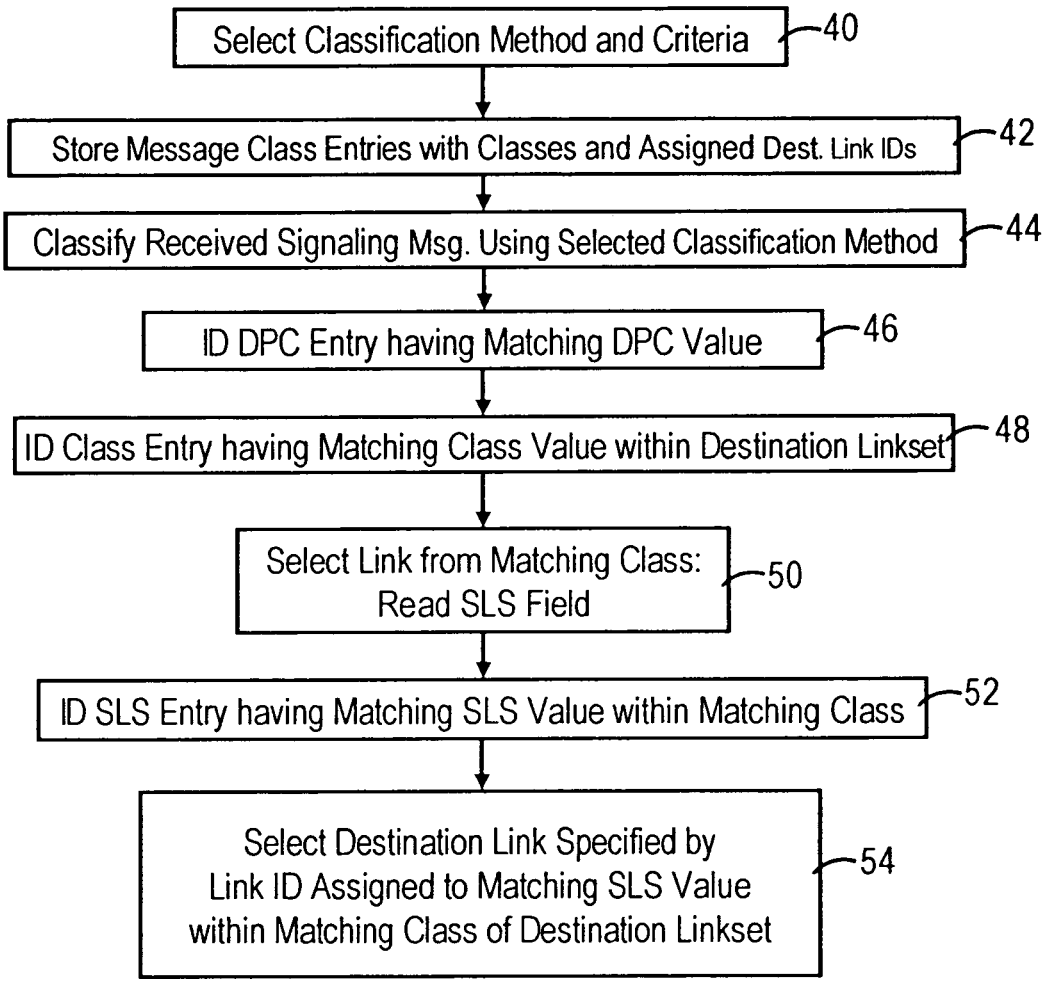
FIG. 4 is a diagram illustrating the method of providing quality of service based switching in an SS7 signaling node based on classifying a received signaling message, according to an embodiment of the present invention.

FIG. 4 is a diagram illustrating the method of classifying and routing a received signaling message according to the determined quality of service class, according to an embodiment of the present invention. The steps described in FIG. 4 can be implemented as executable code stored on a computer readable medium (e.g., a hard disk drive, a floppy drive, a random access memory, a read only memory, an EPROM, a compact disk, etc.).

The method begins in step 40, where the administrator of the signaling network node 10 selects one of the classification methods 26 and the relevant criteria for classifying received signaling messages to a prescribed quality of service class. The network administrator then stores in step 42 the message class entries 24 in the routing table 20 that identify respective message classes 34 and the respective destination link identifiers 36, and any other necessary table entries as illustrated in FIG. 3. Once the classification method has been selected and the message class entries have been stored in the routing table 20, the signaling network node 10 is ready to perform classification based routing.

The processor 18 classifies in step 44 a received signaling message using the selected classification method 26. The processor 18 then selects one of the message class entries 24 having a class identifier 34 matching the classification of the received signaling message. For example, the processor 18 first identifies in step 46 the matching destination point code entry 30 from the linkset entries 22 using the destination point code values of the received signaling message. The processor 18 then matches in step 48 the message class entry 24 having the class identifier 34 matching the class assigned by the processor, for the identified linkset 32. Hence, the processor 18 is able to identify a quality of service class for the destination linkset, specifying at least one destination link 16.

The processor 18 selects in step 50 one of the destination links 16 specified by the matching class entry 34 based on the link corresponding identifiers 36, and based on whether the received signaling message includes an SLS field. In particular, message transfer part 3 (MTP3) routing involves routing of traffic using a signaling link selection field (SLS) located in the signaling link code (SLC) field. The processor 18 reads the SLS field of the received signaling message in step 50, and uses the value from the SLS field as a key to identify an SLS entry 38 having a matching SLS value within the matching class in step 52.

The processor 18 selects in step 54 the destination link 16 specified by the link identifier 36 assigned to the matching SLS value 38 within the matching class 34 of the destination linkset 32. Hence, the received signaling message can be output to a destination link 16 according to a prescribed quality of service class.

According to the disclosed embodiment, SS7 signaling messages can be routed to destination links based on classification and quality of service based link selection, enabling SS7 links to be prioritized based on prescribed message class selection criteria. Hence, different traffic types can be prioritized on respective signaling links, enabling network administrators to more precisely control traffic flows.

As apparent from the foregoing, numerous alternative classification methods and schemes may be utilized, depending on implementation and/or user preference. In additions different routing table implementations may be used for indexing and accessing routing information for messages having respective class types.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A signaling network node configured for routing a received signaling message having message information, the signaling network node comprising:

a routing table configured for storing message class entries identifying respective message classes, each message class entry specifying at least one destination link identifier for a corresponding destination link assigned to the corresponding message class; and a processor configured for selecting one of the destination links based on the processor classifying the received signaling message as assigned to a specific message class based on prescribed message class selection criteria, the processor configured for selecting one of the message class entries based on determining the corresponding identified message class matches the specific message class of the received signaling message, the one message class entry specifying the corresponding destination link identifier for the one destination link;

wherein the destination links are grouped in prescribed linksets having respective linkset identifiers, the routing table further including linkset entries including destination point code entries and the respective assigned linkset identifiers, the processor configured for selecting the one message class entry based on determining a match between a destination point code value in the received signaling message and the destination point code entry of one of the linkset entries, and matching the received signaling message to the one message class entry specifying the at least one destination link within the one linkset identified by the one linkset entry.

2. The node of claim 1, wherein the received signaling message is identified by the processor as corresponding to a message class having a plurality of the destination links assigned, the routing table further including a signaling link selection entry associated with a corresponding one of the destination link identifiers, the processor configured for selecting the one message class entry further based on a match between a signaling link selection value in the received signaling message and one of the signaling link selection entries.

3. The node of claim 1, wherein the prescribed message class selection criteria include classifying the received signaling message based on at least a portion of the destination point code.

4. The node of claim 1, further comprising a plurality of linkset interfaces configured for receiving signaling messages from respective input linksets, the prescribed message class selection criteria including classifying the received signaling message based on identifying one of a plurality of input linksets having supplied the received signaling message.

5. The node of claim 1, wherein the prescribed message class selection criteria include classifying the received signaling message based on prescribed user-selected selection criteria.

6. The node of claim 5, wherein the user-selected selection criteria includes a user-selected data pattern.

7. The node of claim 1, wherein the prescribed message class selection criteria include classifying the received signaling message based on a service indicator value from the received signaling message.

8. The node of claim 1, wherein the prescribed message class selection criteria include classifying the received signaling message based on global title translation (GTT) parameters retrieved from the received signaling message.

9. The node of claim 8, wherein the prescribed message class selection criteria include classifying the received message based on a Global Title Address (GTA) from the GTT parameters.

10. A method in a signaling network node for routing a received signaling message having message information, the method including:

storing message class entries identifying respective message classes in a routing table, each message class entry specifying at least one destination link identifier for a corresponding destination link assigned to the corresponding message class;

classifying the received signaling message as assigned to a specific message class based on prescribed message class selection criteria;

first selecting one of the message class entries based on the corresponding identified message class matching the specific message class of the received signaling message; and second selecting one of the destination links based on the at least one destination link identifier specified in the one message class entry;

wherein:

the destination links are grouped in prescribed linksets having respective linkset identifiers;

the storing step includes storing linkset entries including destination point code entries and the respective assigned linkset identifiers; and the first selecting step includes determining a match between a destination point code value in the received signaling message and the destination point code entry of one of the linkset entries, and matching the received signaling message to the one message class entry specifying the at least one destination link within the one linkset identified by the one linkset entry.

11. The method of claim 10, wherein:

the storing step further includes storing in the routing table a signaling link selection entry associated with a corresponding one of the destination link identifiers;

the second selecting step includes selecting the one message class entry based on a match between a signaling link selection value in the received signaling message and one of the signaling link selection entries.

12. The method of claim 10, wherein the prescribed message class selection criteria include classifying the received signaling message based on at least a portion of the destination point code.

13. The method of claim 10, wherein the prescribed message class selection criteria include classifying the received signaling message based on identifying one of a plurality of input linksets having supplied the received signaling message.

14. The method of claim 10, wherein the prescribed message class selection criteria include classifying the received signaling message based on prescribed user-selected selection criteria.

15. The method of claim 14, wherein the user-selected selection criteria includes a user-selected data pattern.

16. The method of claim 10, wherein the prescribed message class selection criteria include classifying the received signaling message based on a service indicator value from the received signaling message.

17. The method of claim 10, wherein the prescribed message class selection criteria include classifying the received signaling message based on global title translation (GTT) parameters retrieved from the received signaling message.

18. The method of claim 17, wherein the prescribed message class selection criteria include classifying the received message based on a Global Title Address (GTA) from the GTT parameters.

19. A computer readable medium having stored thereon sequences of instructions for routing a received signaling message by a signaling network node, the sequences of instructions including instructions for performing the steps of:

storing message class entries identifying respective message classes in a routing table, each message class entry specifying at least one destination link identifier for a corresponding destination link assigned to the corresponding message class;

classifying the received signaling message as assigned to a specific message class based on prescribed message class selection criteria;

first selecting one of the message class entries based on the corresponding identified message class matching the specific message class of the received signaling message; and second selecting one of the destination links based on the at least one destination link identifier specified in the one message class entry;

wherein:

the destination links are grouped in prescribed linksets having respective linkset identifiers;

the storing step includes storing linkset entries including destination point code entries and the respective assigned linkset identifiers; and the first selecting step includes determining a match between a destination point code value in the received signaling message and the destination point code entry of one of the linkset entries, and matching the received signaling message to the one message class entry specifying the at least one destination link within the one linkset identified by the one linkset entry.

20. The medium of claim 19, wherein:

the storing step further includes storing in the routing table a signaling link selection entry associated with a corresponding one of the destination link identifiers;

the second selecting step includes selecting the one message class entry based on a match between a signaling link selection value in the received signaling message and one of the signaling link selection entries.

21. A signaling network node configured for routing a received signaling message, the signaling network node comprising:

means for storing message class entries identifying respective message classes, each message class entry specifying at least one destination link identifier for a corresponding destination link assigned to the corresponding message class;

means for classifying the received signaling message as assigned to a specific message class based on prescribed message class selection criteria;

first means for selecting one of the message class entries based on the corresponding identified message class matching the specific message class of the received signaling message; and second means for selecting one of the destination links based on the at least one destination link identifier specified in the one message class entry;

wherein:

the destination links are grouped in prescribed linksets having respective linkset identifiers;

the storing means is configured for storing linkset entries including destination point code entries and the respective assigned linkset identifiers; and the first means is configured for determining a match between a destination point code value in the received signaling message and the destination point code entry of one of the linkset entries, and matching the received signaling message to the one message class entry specifying the at least one destination link within the one linkset identified by the one linkset entry.

22. The node of claim 21, wherein:

the storing means is configured for storing a signaling link selection entry associated with a corresponding one of the destination link identifiers;

the second means is configured for selecting the one message class entry based on a match between a signaling link selection value in the received signaling message and one of the signaling link selection entries.

23. The node of claim 21, wherein the prescribed message class selection criteria include classifying the received signaling message based on at least a portion of the destination point code.

24. The node of claim 21, wherein the prescribed message class selection criteria include classifying the received signaling message based on identifying one of a plurality of input linksets having supplied the received signaling message.

25. The node of claim 21, wherein the prescribed message class selection criteria include classifying the received signaling message based on prescribed user-selected selection criteria.

26. The node of claim 25, wherein the user-selected selection criteria includes a user-selected data pattern.

27. The node of claim 21, wherein the prescribed message class selection criteria include classifying the received signaling message based on a service indicator value from the received signaling message.

28. The node of claim 21, wherein the prescribed message class selection criteria include classifying the received signaling message based on global title translation (GTT) parameters retrieved from the received signaling message.

29. The node of claim 28, wherein the prescribed message class selection criteria include classifying the received message based on a Global Title Address (GTA) from the GTT parameters.

30. The node of claim 1, wherein the processor is configured for classifying the received signaling message independent of any information in the routing table.

31. The method of claim 10, wherein the classifying includes classifying the received signaling message independent of any information in the routing table.

32. The medium of claim 19, wherein the classifying includes classifying the received signaling message independent of any information in the routing table.

33. The node of claim 21, wherein the means for classifying is configured for classifying the received signaling message independent of any information in the means for storing.

34. The node of claim 1, wherein the processor is configured for classifying the received signaling message independent of any signaling link selection value within the received signaling message.

35. The method of claim 10, wherein the classifying includes classifying the received signaling message independent of any signaling link selection value within the received signaling message.

36. The node of claim 21, wherein the means for classifying is configured for classifying the received signaling message independent of any signaling link selection value within the received signaling message.

37. The node of claim 30, wherein the processor is configured for classifying the received signaling message independent of any signaling link selection value within the received signaling message.

38. The method of claim 31, wherein the classifying includes classifying the received signaling message independent of any signaling link selection value within the received signaling message.

39. The node of claim 33, wherein the means for classifying is configured for classifying the received signaling message independent of any signaling link selection value within the received signaling message.

* * * * *